US005553877A

United States Patent [19]

Huang

[11] Patent Number: 5,553,877
[45] Date of Patent: Sep. 10, 1996

[54] FOLDABLE TOY SHOPPING TROLLEY

[76] Inventor: Ming-tai Huang, 4th Fl., No. 302, Sec. 7, Chengteh Rd., Taipei, Taiwan

[21] Appl. No.: 543,360

[22] Filed: Oct. 16, 1995

[51] Int. Cl.[6] .................................................. B62B 7/06
[52] U.S. Cl. ............................... 280/33.997; 280/33.993; 280/651; 446/268; 446/450; D34/20
[58] Field of Search ..................... 280/33.993, 33.996, 280/33.997, 639, 651; 446/268, 269, 450, 451, 470; D34/19, 20

[56] References Cited

U.S. PATENT DOCUMENTS

| D. 363,589 | 10/1995 | Lafleur et al. | D34/19 |
|---|---|---|---|
| 3,118,553 | 1/1964 | Rosenweig | 280/651 X |
| 3,885,806 | 5/1975 | Trubiano | 280/33.993 |
| 4,655,502 | 4/1987 | Houllis | 280/33.993 X |
| 5,312,122 | 5/1994 | Doty | 280/33.993 X |

FOREIGN PATENT DOCUMENTS

| 0043873 | 1/1982 | European Pat. Off. | 280/651 |
|---|---|---|---|
| 2234472 | 2/1991 | United Kingdom | 280/33.996 |

Primary Examiner—Brian L. Johnson
Attorney, Agent, or Firm—Peterson, Wicks, Nemer & Kamrath, P.A.

[57] ABSTRACT

A toy shopping trolley includes a base, a handle, a bracket and a seat, the base composed of a pair of frames and having wheels disposed on a bottom of each of the frames, the handle pivotally engaged to the pair of frames so as to be pivotally folded to be parallel to the base, the bracket having an open top and an open rear end and composed of a bottom, two sides and a front side, each of the sides having an upper edge and a hook extending from a rear end to the respective upper edge, the bracket having a bar extending laterally from a respective side of a rear end thereof, the seat composed of a first part and a second part which is pivotally engaged to a bottom of the first part, the second part having an extension portion extending longitudinally from a top thereof being received in the hole defined in each one of the two legs of the handle and the two hooks of the bracket engaged with the extension parts of the second part of the seat, the bar of the bracket contacting against the two legs of the handle.

1 Claim, 5 Drawing Sheets

5,553,877

FOLDABLE TOY SHOPPING TROLLEY

BACKGROUND OF THE INVENTION

The present invention relates to a toy shopping trolley and more particularly to a foldable toy shopping trolley.

In play, children love to imitate the daily actions of their parents and "play shopping" is a particularly enjoyable form of such imitation. However, even a reduced-scale toy shopping trolley will still occupy a lot of space when not in use. A toy shopping trolley is designed for a child to play with and which has the same configuration as the real shopping trolley and includes most of the functions of the real shopping trolley. The present invention intends to provide a toy shopping trolley containing the functions mentioned above and can be easily folded so as to occupy a less space.

SUMMARY OF THE INVENTION

The present invention provides a toy shopping trolley which includes a base with wheels, a handle pivotally engaged to the base, a bracket and a seat which has an extension portion extending laterally from a respective one of two sides of the seat and each of the extensions is received in a hole defined in each of two legs of the handle, the bracket being pivotally engaged to the seat and having a bar extending laterally from a respective one of two sides thereof so as to contact against the two legs of the handle such that the bracket can be easily disengaged from the seat and both of the handle and the seat can be pivotally folded to be parallel to the base.

It is an object of the present invention to provide a toy shopping trolley which is easily folded.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
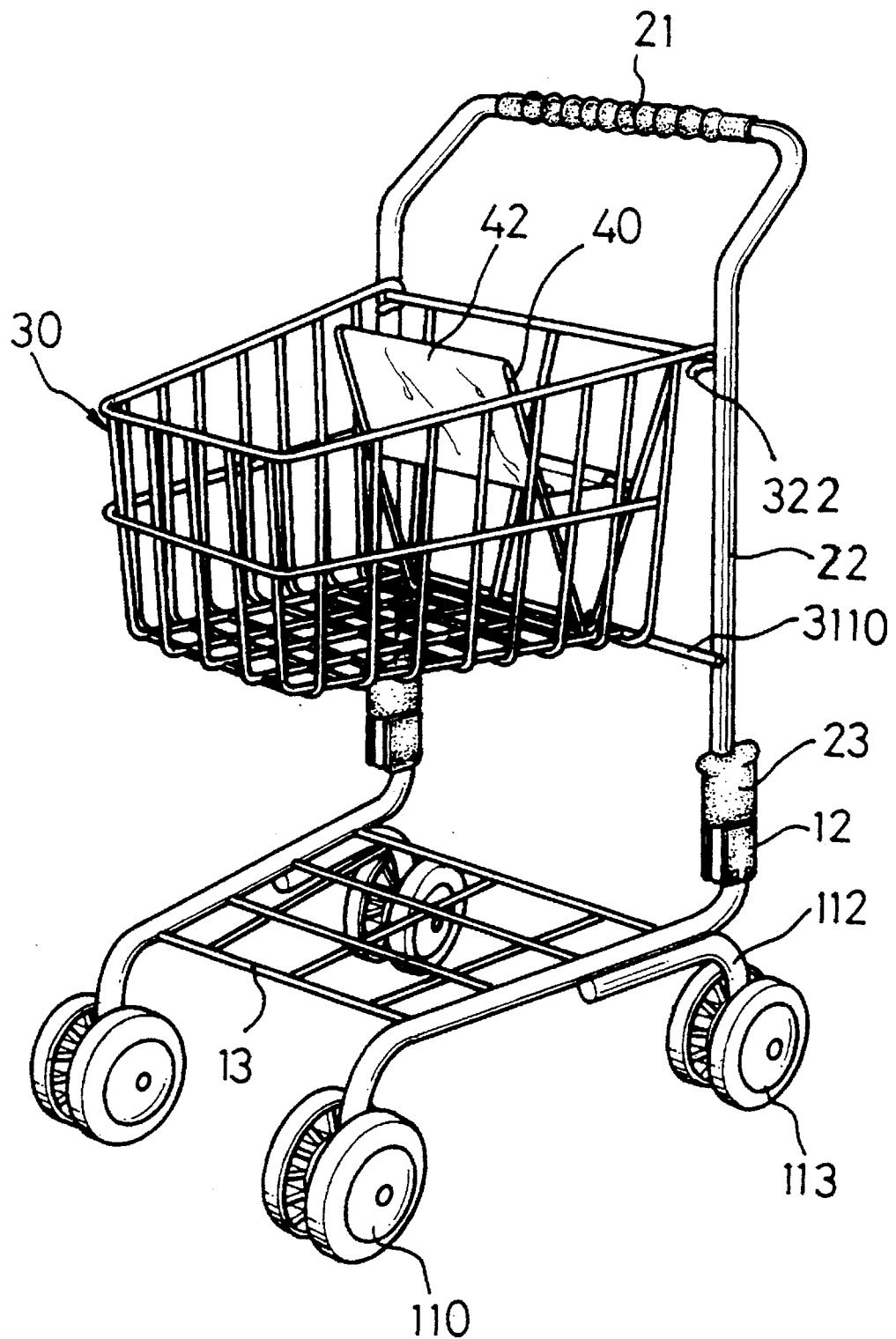
FIG. 1 is a perspective view of a toy shopping trolley in accordance with the present invention.
Figure 2:
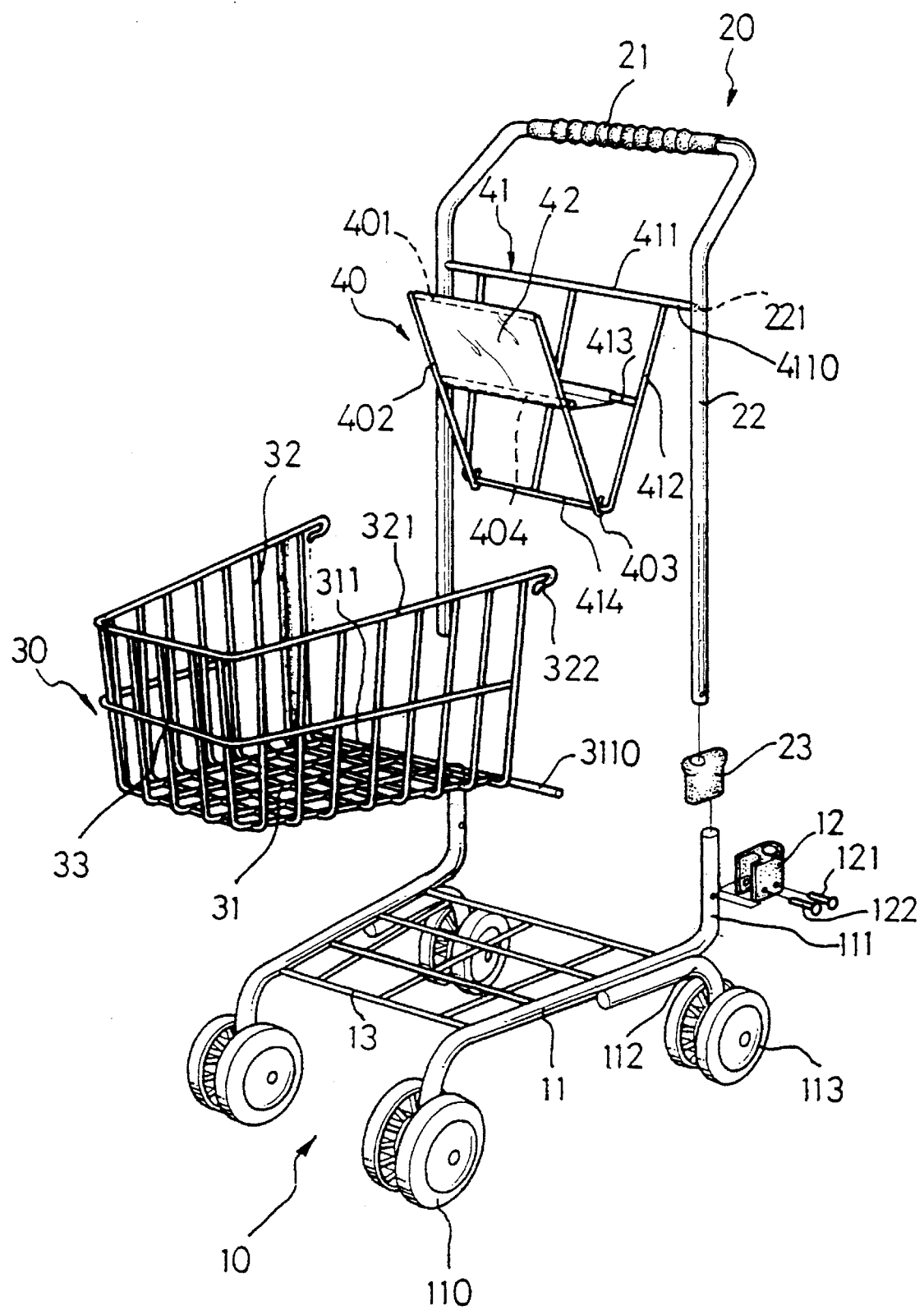
FIG. 2 is an exploded view of the toy shopping trolley in accordance with the present invention.
Figure 3:
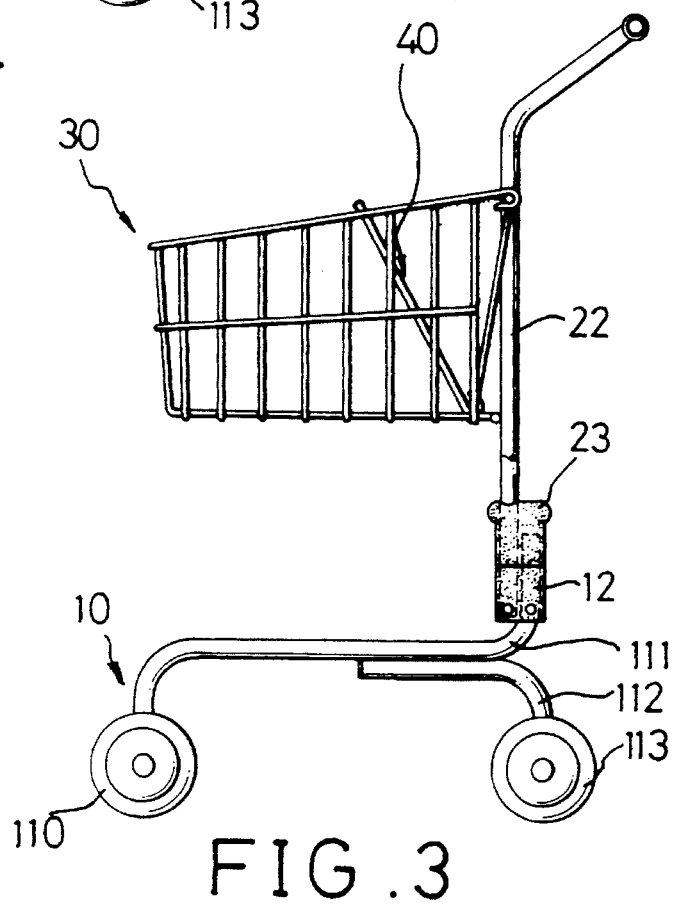
FIG. 3 is a side elevational view, partly in section, of the toy shopping trolley in accordance with the present invention.

Referring to the drawings and initially to FIGS. 1 through 3, a toy shopping trolley in accordance with the present invention generally includes a base 10 which includes a pair of frames 11, each of the frames 11 having a front end to which a front wheel 110 is rotatably disposed, and a rear end comprising an upper end 111 and a lower end 112 which has a rear wheel 113 rotatably disposed thereto, a U-shaped connecting element 12 transversely connected to the upper end 111 by a pin 121 extending through the connecting element 12 and the upper end 111, and a plurality of rods 13 connected between the two frames 11 such that goods can be disposed on these rods 13.

A handle 20 is a U-shaped element comprising a gripping portion 21 and two legs 22 each extending from a respective one of two ends of the gripping portion 21. Each one of the two legs 22 has an end and each one of the ends is arranged adjacent to the respective upper end 111 of the respective frame 11 and is pivotally engaged to the connecting element 12 by another pin 122 and near an open end of the connecting element 12. Two sockets 23 each are mounted to the respective one of the legs 22 of the handle 20 and receive the corresponding upper end 111 extending from the connecting element 12, each one of the sockets 23 being located above the respective U-shaped connecting element 12. Each of the legs 22 has a hole 221 defined in a periphery thereof.

A bracket 30 comprises a bottom 31, two sides 32 each extending from a respective one of two sides of the bottom 31 and a front side 33 such that the bracket 30 has an open rear end and an open top. Each of the sides 32 has an upper edge 321, the upper edge 321 of each of the two sides 32 having a hook 322 extending longitudinally from a rear end thereof and the bottom 31 having a bar 311 extending laterally from a rear end thereof. The bar 311 having a distal portion 3110 extending longitudinally from one of each ends thereof respectively. A length of the bar 311 is longer than a distance between the two legs 22 of the handle 20.

Figure 6:
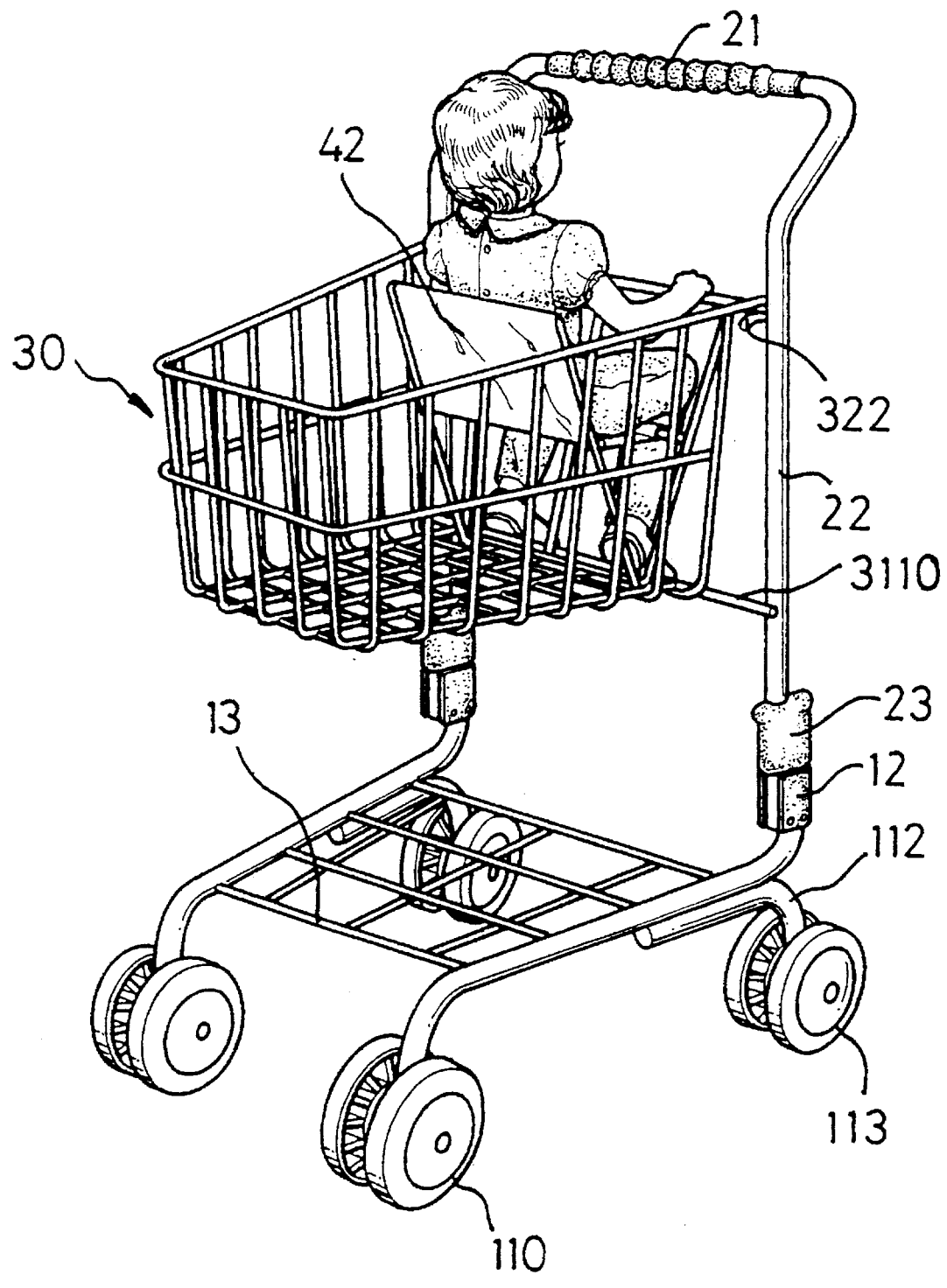
FIG. 6 is a perspective view of the toy shopping trolley with a doll sitting in the seat.

A seat comprises a first part 40 and a second part 41, the first part 40 being an inverted U-shaped element and comprising a first top rod 401 (shown by phantom lines in FIG. 2) and two first legs 402, each one of the two first legs 402 extending from a respective one of two ends of the first top rod 401 and having a first hook portion 403 formed to a distal end thereof, a first middle rod 404 (shown by phantom lines in FIG. 2) connected between the two first legs 402. The second part 41 is a rectangular element and has a second top rod 411, two second legs 412 each one of which extending from a respective one of two ends of the second top rod 411, a second middle rod 413 connected between the two second legs 412 and a bottom rod 414 connected between a lower end of each of the two second legs 412. Each one of the two first hooks 403 is engaged to the bottom rod 414, a fabric 42 interconnected between the first top rod 401 and the second middle rod 413 via the first middle rod 404 so as to form a seat portion between the first middle rod 404 and the second middle rod 413, and a back portion formed between the first top rod 401 and the first middle rod 404 such that a doll as shown in FIG. 6 can be sat in the seat 40 when a child (not shown) plays with the toy shopping trolley. The second top rod 411 having an extension portion 4110 extending longitudinally from each one of two ends thereof respectively so as to be received in the respective hole 221 of the respective leg 22 of the handle 20. Each one of the hooks 322 of the bracket 30 is engaged to the respective extension portion 4110 of the second part 41 of the seat 40 and each one of the distal stud portions 3110 of the bar 311 contacts against the respective leg 22 of the handle 20.

Figure 4:
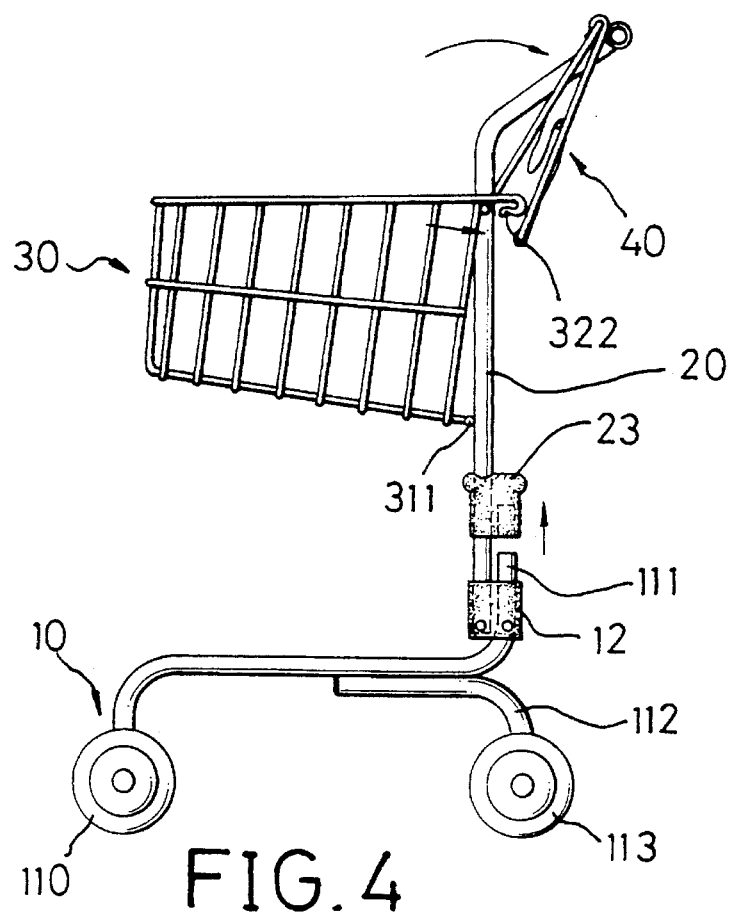
FIG. 4 is an illustrative view to show how the seat is folded and the bracket is disengaged from the seat.
Figure 5:
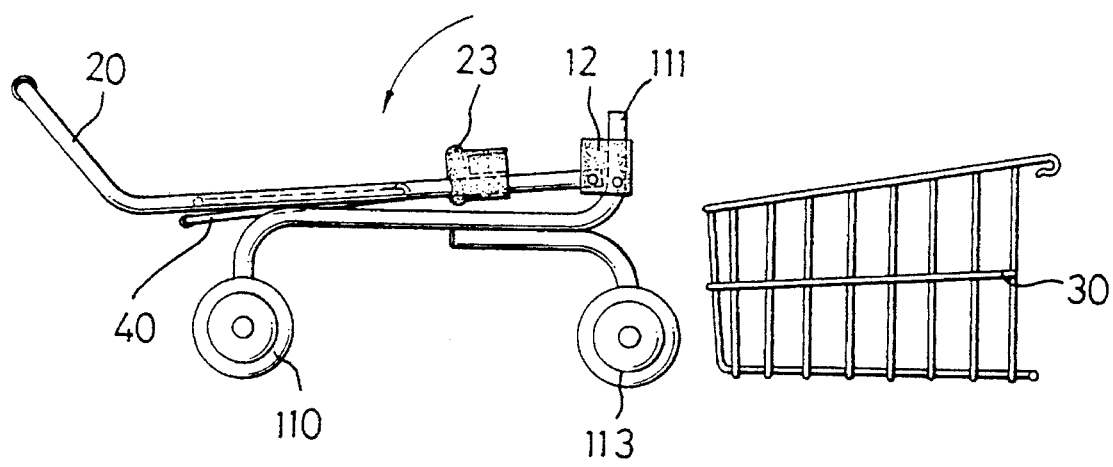
FIG. 5 is a side elevational view showing that the toy shopping trolley is folded with the bracket being disengaged apart from the seat.

Referring now to FIGS. 4 and 5, the bracket 30 can be disengaged from the extension portions 4110 by pushing the bracket 30 toward the handle 20 such that the hooks 322 are disengaged from the extension portions 4110, the seat 40 can be pivotally connected the first and the second parts 40, 41 together so as to be folded to dispose the seat 40 parallel to the handle 20 which can be pivotally rotated about an axis of the pin 122 to be parallel to a plane formed by the pair of frames 11 after pulling the socket 23 upwardly along the respective frame 22 to disengage the socket 23 from the upper end 111.

Although the invention has been explained in relation to its preferred embodiment, it is to be understood that many other possible modifications and variations can be made without departing from the spirit and scope of the invention as hereinafter claimed.

I claim:

1. A foldable toy shopping trolley comprising:

a base which includes a pair of frames, each of the frames having a front end and having a front wheel rotatably disposed to said front end, and a rear end comprising an upper end and a lower end which has a rear wheel rotatably disposed thereto, a U-shaped connecting element transversely connected to said upper end by a pin extending through said connecting element and said upper end, a plurality of rods connected between said pair of frames;

a handle being a U-shaped element comprising a gripping portion and two legs, each one of said legs extending from a respective one of two ends of said gripping portion, each one of the two legs having an end and each one of said ends arranged adjacent to said respective upper end of said respective frame and pivotally engaged to said connecting element and near an open end of said connecting element, each one of said legs having a hole defined in a periphery thereof;

a bracket comprising a bottom, two sides each extending from a respective one of two sides of said bottom and a front side such that said bracket has an open rear end and an open top, each one of said sides having an upper edge, said upper edge of each of said two sides having a hook extending longitudinally from a rear end thereof and said bottom having a bar extending laterally from a rear end thereof, said bar having a distal stud portion extending longitudinally from each one of two ends thereof, a length between said distal portions of said bar being longer than a distance between said two legs of said handle, and a seat comprising a first part and a second part, said first part being an inverted U-shaped element and comprising a first top rod and two first legs, each one of said two first legs extending from a respective one of two ends of said first top rod and having a first hook portion formed to a distal end thereof, a first middle rod connected between said two first legs, said second part being a rectangular element and having a second top rod, two second legs each extending from a respective one of two ends of said second top rod, a second middle rod connected between said two second legs and a bottom rod connected between a lower end of each one of said two second legs, each one of said two first hooks engaged to said bottom rod, a fabric interconnected between said first top rod and said second middle rod via said first middle rod, said second top rod having an extension portion extending longitudinally from each one of two ends thereof respectively so as to be received in said respective hole of said respective leg of said handle, each one of said hooks of said bracket engaged to said respective extension portion of said second part of said seat and each one of said stud portions contacting against said respective leg of said handle.

* * * * *